Nov. 28, 1933.  H. E. IVES  1,937,118
PROJECTING PICTURES IN STEREOSCOPIC RELIEF
Filed Feb. 26, 1931
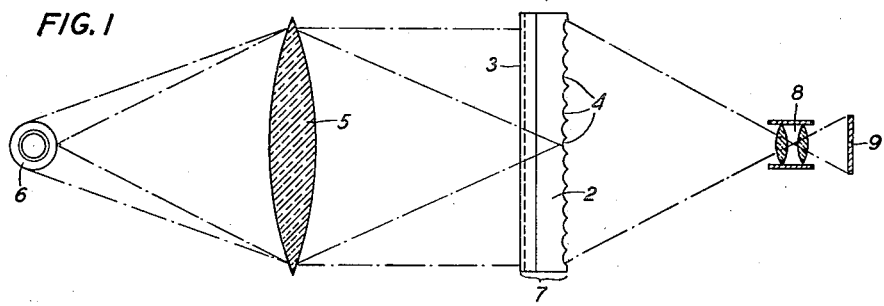
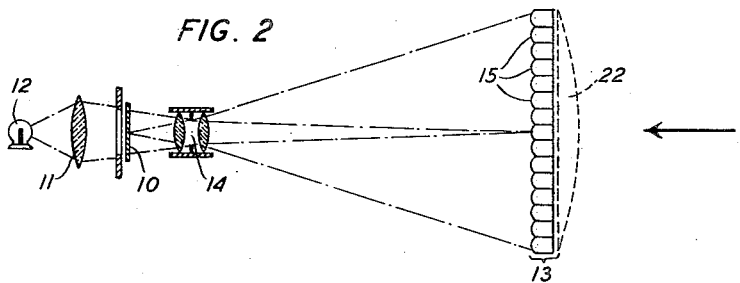
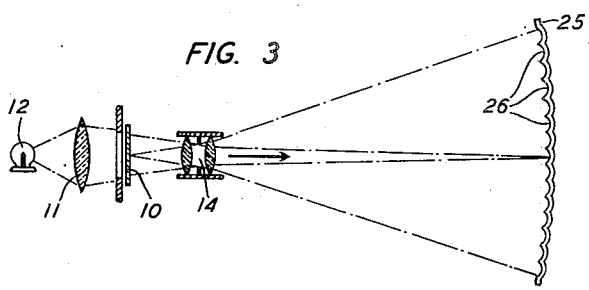
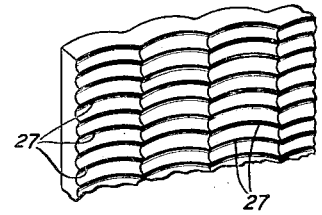
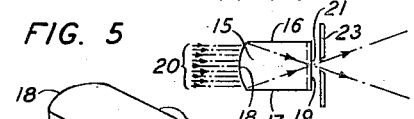
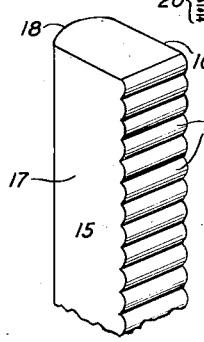
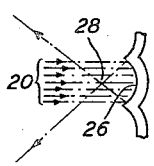
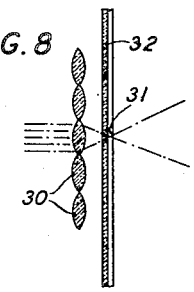
INVENTOR
H. E. IVES
BY
Stanley B. Kent.
ATTORNEY Patented Nov. 28, 1933

1,937,118

UNITED STATES PATENT OFFICE 1,937,118

PROJECTING PICTURES IN STEREOSCOPIC RELIEF

Herbert E. Ives, Montclair, N. J., assignor to Bell Telephone Laboratories, Incorporated, New York, N. Y., a corporation of New York Application February 26, 1931. Serial No. 518,335

15 Claims. (Cl. 88—16.6)

This invention relates to the producing of pictures in stereoscopic relief and more particularly to the projection of stereoscopic parallax panoramagram images to produce pictures to be viewed in stereoscopic relief.

An object of the invention is to provide a new and useful projection system whereby an image of a stereoscopic parallax panoramagram may be projected and viewed as pictures having stereoscopic relief.

The invention is applicable to either still or motion pictures.

A characteristic of the new system is that the stereoscopic relief effect is produced by reason of the formation of real images of the projection lens corresponding to elemental portions of the object image. The vertical extent of the object image is made visible by the vertical planar diffusion of the elemental light beams forming these real images.

The invention may be embodied in a variety of forms. A limited number of embodiments will be described herein for illustrative purposes.

In one arrangement illustrative of the invention, a lenticular type of viewing screen is employed. This screen is made up of a plurality of four-sided glass rods. Two opposite sides of each rod are flat, the third is convex cylindrical, the axis of curvature being parallel to and centrally located between the flat sides, and the fourth is ribbed or corrugated, the ribs lying at right angles to the axis of the cylindrical surface. The rods are arranged with a flat side of one rod adjacent to a flat side of another, the convex surfaces forming one face of the screen and the ribbed surfaces the other. An image of a stereoscopic parallax panoramagram is projected upon this screen by means of a small projection lens. The panoramic strips are projected in register with the convex surfaces. The rods constitute cylindrical lenses and the convex surfaces are so shaped that narrow elongated real images of the projection lens are formed at the ribbed surfaces. By viewing this screen from the ribbed side, pictures in stereoscopic relief may be seen by an observer due to the fact that each eye sees only the light rays passing through a narrow strip sector of each convex surface, the intensity of the observed light in turn being determined by the particular corresponding portion of the panoramic strip of the parallax panoramagram at the time being projected on that sector. A different strip sector is visible for each position of any one eye within the viewing angle.

The lens function of the rods and the light diffusing function of the ribbed surfaces may be performed by physically separate elements. Thus double convex cylindrical lenses may be located side by side to form the narrow elongated real images outside the lenses themselves and a sheet of ribbed glass located in the image space to cause vertical planar diffusion of the transmitted light.

In a modification of this arrangement for viewing by transmitted light, a large plano-convex cylindrical deviating lens is placed on the ribbed side of the screen with the plane face adjacent the screen. This deviating lens compensates for the divergence of the cones of light from the elements of the screen located to either side of a vertical plane coinciding with the optical axis of the projection lens. This plane is hereinafter called the vertical central plane of the system. The same effect may be produced by cutting the flat ribbed faces of the rods so that they will form progressively greater angles with the vertical central plane the farther they stand from this plane.

In still another arrangement illustrative of the invention, a mirror-like reflecting type of screen is employed. The face of the screen consists of a plurality of parallel elongated concave cylindrical surfaces provided with transverse ribs, the resulting grooved ribbed surface being made mirror-like reflecting. An image of a stereoscopic parallax panoramagram is projected on the face of this screen with the panoramic strips in register with the concave surfaces. These concave surfaces form narrow elongated real images of the projection lens in the space in front of the screen. An observer viewing these images then sees pictures in stereoscopic relief, the appearance changing with the angle of viewing. This screen is preferably fabricated of thin metal which is given sufficient curvature about a vertical axis located in the central vertical plane to suitably direct the reflected light from the elemental grooves to either side of the central plane into the region of observation.

The appearance to an observer of the pictures produced according to the present invention closely resembles that produced by projecting an image of a stereoscopic parallax panoramagram upon a translucent screen and viewing it through an opaque line grating in the manner disclosed in a copending application of H. E. Ives, Serial No. 338,642, filed February 9, 1929. The present invention, however, has an advantage due to a more efficient use of the projected light.

A more detailed description of the invention follows having reference to the accompanying drawing.

Fig. 1 illustrates a typical arrangement for producing a stereoscopic parallax panoramagram negative.

Fig. 2 shows an embodiment of the invention in which a lenticular type of viewing screen is used.

Fig. 3 shows an embodiment of the invention in which a mirror-like reflecting type of viewing screen is used.

Figs. 4 and 5 illustrate details of the screen of Fig. 2.

Figs. 6 and 7 illustrate details of the screen of Fig. 3.

Fig. 8 shows a modified form of the screen of Fig. 2.

Like reference characters are used to designate identical elements in the several figures.

Referring now to Fig. 1, a large lens 5 is arranged to form an image of an object 6 on a screen or grating 7, the right-hand face of which is photographed by an objective lens 8 on a photographic emulsion 9. The lens 5 is so large that it can look around the object 6 so that the image formed in the space occupied by the screen 7 is a composite image of the object as viewed from different directions. The screen 7 consists of a sheet of transparent material 2 having vertical cylindrical grooves 4 on its right-hand face and light diffusing ribs on its left-hand face 3. The ribs are substantially at right angles to the grooves. The emulsion 9 may be carried by any suitable form of carrier such as a motion picture film. This film may be moved through the camera in any well-known manner to expose successive frames. Each groove 4 functions to form a virtual image of the large lens 5 on the side of the groove toward the large lens 5. These virtual images are in effect panoramic strips of the object image and are photographed on the emulsion 9 by the lens 8 so that the negative formed on the emulsion 9 is a stereoscopic parallax panoramagram negative. For further details of this taking arrangement reference may be had to a copending application of H. E. Ives, Serial No. 518,334 filed February 26, 1931.

For projection purposes a positive transparency 10 is produced by contact printing from the negative 9.

An arrangement for projecting such a stereoscopic parallax panoramagram to produce pictures visible in stereoscopic relief is shown in Fig. 2. The positive 10 is illuminated through the lens 11 by the light 12. An image of the positive 10 is projected upon a screen 13 by a relatively small projection lens 14. The screen 13 consists of a plurality of elongated lenticular elements 15 arranged side by side. The panoramic strips of the parallax panoramagram 10 are projected in register on the convex faces of the lenticular elements 15. If this screen is viewed from the right-hand side in the direction indicated by the arrow, an observer will see a picture of the object in stereoscopic relief. This picture may be viewed from different directions and at different distances from the screen.

Each of the lenticular elements 15 of the screen 13 has a cross-sectional shape illustrated in Fig. 4. It is a four-sided transparent rod. Two opposite sides 16 and 17 are parallel and flat. The left-hand side 18 is a convex cylindrical surface whose axis lies midway between the two parallel sides and is perpendicular to the plane of the paper. The fourth side 19 is a flat ribbed or corrugated surface, the ribs lying at right angles to the axis of the cylindrical surface 18. The cylindrical surface 18 has such a radius of curvature that an elongated image of the projection lens 14 is formed at the ribbed surface 19. The ribs 19 function to diffuse the image forming rays in planes passing through the image and lying parallel to the axis of the surface 18. In other words they cause planar diffusion in vertical planes. The image forming action is illustrated by the lines 20 to the left of the surface 18 which illustrate bundles of light rays forming different portions of the parallax panoramagram strip image projected on the surface 18. These beams are diverted to form an image at the point 21. Thus an eye positioned to the right of the image 21 will see it only by virtue of the rays coming from a particular narrow portion of the surface 18 dependent upon the location of the observing eye. It is seen that the location of the observer determines the portion of the parallax panoramagram image which he will see. Since only a narrow strip of surface 19 is utilized for viewing an apertured screen 23 may be placed as shown. The ribbed surface 19 is illustrated in Fig. 5 and shows how the element 15 would look to an observer close enough to actually see the ribbed structure. This ribbing and also the elements 15 themselves are so small that they are practically indistinguishable to an observer of the pictures in stereoscopic relief or at least small enough to make possible the viewing of the picture with desired details.

As the surface of the screen 13 is increased, a size will be reached where the light rays passing through the peripheral elements are no longer visible within the viewing angle and the side portions of the image become invisible. To obviate this condition, a large plano-convex lens 22 may be placed adjacent to the ribbed face of the screen 13 to deviate the transmitted rays toward the vertical central plane within the viewing space. This difficulty may also be obviated by cutting the ribbed faces of the rods 15 of progressively greater angles the farther they stand from the center of the screen, that is, the farther they stand from the vertical plane which coincides with the optical axis of the projection lens.

Referring now to Fig. 3, another arrangement is disclosed for projecting stereoscopic parallax panoramagrams to produce pictures visible in stereoscopic relief. The formation of an image by projection of the parallax panoramagram positive 10 is accomplished in the same manner as in Fig. 2. A reflecting screen 25, however, is used in place of the lenticular screen 13 of Fig. 2. The reflecting face of screen 25 consists of a plurality of adjacent vertical concave grooves 26 provided with transverse ribs or corrugations. This ribbed surface is made reflecting in any suitable manner. For instance, the screen may be fabricated from a sheet of metal, the face of which is given a high polish to render it mirror-like reflecting. The concave surfaces have such a radius that elongated real images of the projection lens 14 are formed a short distance in front of each surface. The transverse ribbing causes vertical planar diffusion of the elemental light beams forming this image so that the whole vertical extent of the screen may be seen by an observer located at any point within the viewing angle.

Further details of these concave reflecting surfaces are illustrated in Figs. 6 and 7. The concave surface 26 is provided with ribs 27 formed by transverse grooves shown in Fig. 7. The beams 20 of light rays forming the image of the parallax panoramagram strip at the surface 26 are reflected to form an image of the projection lens 14 at the point 28. An eye located to the left of the reflecting surface 26 will receive light from only a small portion of the panoramic strip, the particular portion which is seen being dependent upon the location of the eye within the viewing field. When the screen as a whole is viewed by looking in the direction indicated by the arrow in Fig. 3, a picture in stereoscopic relief is seen.

In order that the elements of the screen to either side of the central vertical plane may be properly viewed, the whole face of the screen may be given a generally cylindrical concave shape about a vertical axis in the neighborhood of the projection lens 14. This curved shape is indicated in Fig. 3. Such a curved shape for the screen is only necessary when the width of the screen is large compared with the viewing space.

A modified form of Fig. 2 is illustrated in Fig. 8. In this arrangement double convex cylindrical lenses 30 are used, the images being formed outside and to the right of the lenses 30 as indicated at the point 31. A sheet of horizontally ribbed glass 32 or similar planar diffusing material is located in the space where the image is formed to diffuse the light in a vertical direction in the same way that the ribbed surfaces of the lenticular elements in Fig. 2 diffuse the elemental beams of light. A deviating lens such as that described in connection with Fig. 2 may also be located with its plane face adjacent to the ribbed sheet 32 in Fig. 8.

The term "stereoscopic parallax panoramagram" as used in this specification signifies a parallax panoramagram which has an orientation of the elemental portions of each panoramic strip such as is obtained by exposing a photographic emulsion through an opaque line grating fixed with respect to the emulsion and slightly separated from it by means of a lens moved around the object; that is, the element of any panoramic strip corresponding to the right-hand aspect of the object is located nearest to the left-hand side of the object as pictured. Such a stereoscopic parallax panoramagram and camera for producing the exposure is described in a paper by H. E. Ives entitled "A camera for making parallax panoramagrams" published in the Journal of the Optical Society of America for December 1928 beginning at page 435. As hereinbefore stated, the negative produced in the arrangement of Fig. 1 of this application is a stereoscopic parallax panoramagram negative.

The term "planar diffusion" applies to such diffusion of the rays of an elemental beam of light that the rays which lie in a given plane before diffusion, all lie in the same plane after diffusion. The rays of the elemental beam may or may not be parallel to one another before diffusion takes place. They, of course, are not parallel after diffusion takes place.

The terms vertical and horizontal are used in this specification in the same sense that they are used when it is said that the columns of a newspaper are vertical and the lines horizontal. In this sense these terms are used without reference to the absolute position of the paper in space.

Other arrangements than those described in detail hereinbefore come within the purview of this invention which is defined in the appended claims.

What is claimed is:

1. In a system for producing pictures in stereoscopic relief, means to project an image of a stereoscopic parallax panoramagram, and means utilizing the light rays which form separated portions of a panoramic strip of said image to form a real image of said projecting means.

2. In a system for producing pictures in stereoscopic relief, a plurality of elemental image forming means arranged side by side to constitute a viewing screen, and means to project a stereoscopic parallax panoramagram upon one side of said screen, each elemental image forming means functioning to form a real image of said projecting means.

3. In a system for producing pictures in stereoscopic relief, a plurality of elemental image forming means arranged side by side to constitute a viewing screen, means to project a stereoscopic parallax panoramagram upon one side of said screen, each elemental image forming means functioning to form a real image of said projecting means, and means to cause planar diffusion of the elemental light beams forming said real images.

4. In a system for producing pictures in stereoscopic relief, a plurality of elemental lenticular elements arranged side by side to constitute a viewing screen, and a projecting lens to project a stereoscopic parallax panoramagram upon said elements, each element utilizing the light from said projecting lens to form a real image of said lens.

5. In a system for producing pictures in stereoscopic relief, a plurality of elemental lenticular elements arranged side by side to constitute a viewing screen, a projecting lens to project a stereoscopic parallax panoramagram upon said elements, each element utilizing the light from said projection lens to form a real image of said lens, and means to cause planar diffusion of the elemental light beams forming said real images.

6. In a system for producing images for viewing stereoscopic relief, means for projecting an image comprising sets of strips, each strip of a set corresponding to an elemental portion of an object from a different point of view from that of another strip and the different sets representing different elemental portions, the strips of each set being stereoscopically positioned, and a plurality of elongated transparent plano-convex elements arranged in parallelism in the image space and adapted to be viewed from the plane side of said elements to produce pictures visible in stereoscopic relief.

7. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being stereoscopically positioned, and a plurality of plano-convex cylindrical lenticular elements positioned side by side upon which said image is projected and so constructed and arranged that substantially parallel beams of light representing said sets of strips incident upon the convex surface of said lenticular elements are focussed at the plane surface of said lenticular elements, and means to vertically diffuse elemental portions of said incident light beams.

8. In a system for producing pictures in stereoscopic relief, a plurality of elemental lenticular elements arranged side by side on either side of the vertical central plane to constitute a viewing screen, means to project a stereoscopic parallax panoramagram upon one side of said screen, each element of said screen being so shaped as to utilize the light from said projecting means to form a real image of said means, and a plano-convex lens located on the side of said screen away from said projecting means with the plane side nearer the screen to deviate the light from each element toward the central plane.

9. In a system for producing pictures in stereoscopic relief, means for projecting a stereoscopic parallax panoramagram, means for individually viewing separate portions of each panoramic strip from a given horizontal direction, and means for causing vertical planar diffusion of the projected elemental beams of light representing elemental strip images of said panoramagram.

10. In a system for producing pictures in stereoscopic relief, a motion picture film having a plurality of stereoscopic parallax panoramagram pictures printed thereon, means for projecting strip images of said panoramagram pictures, a viewing screen upon which said images are projected, comprising means to control the direction of horizontal transmission of the light rays forming different portions of the panoramic strips, and means for causing vertical planar diffusion of the projected elemental light beams representing strip images of said panoramagram pictures.

11. In a system for producing pictures for viewing in stereoscopic relief, means for projecting stereoscopic strip images of an object upon a viewing screen, said screen having horizontally positioned means for causing vertical diffusion exclusively of the elemental light beams representing strip images of said object, and vertically positioned means for causing horizontal diffusion exclusively of said elemental beam, whereby pictures may be viewed in stereoscopic relief.

12. The method of projecting images visible in stereoscopic relief which comprises projecting an image of a stereoscopic parallax panoramagram, deviating the light rays which form elemental portions of each panoramic strip so that they all pass to and through a point in space close to said image, and viewing said rays after they pass through said point.

13. The method of projecting images visible in stereoscopic relief which comprises projecting an image of a stereoscopic parallax panoramagram, deviating the light rays which form each panoramic strip so that they all pass through a linear element of space relatively close to said image, and diffusing said rays exclusively in planes lying in said linear element after passing through said linear element.

14. In a system for producing pictures in stereoscopic relief, a plurality of elemental concave mirror-like reflecting surfaces arranged side by side to constitute a viewing screen, and a projecting lens to project a stereoscopic parallax panoramagram upon said elements, each element utilizing the light from said projecting lens to form a real image of said lens.

15. In a system for producing pictures in stereoscopic relief, a plurality of elemental concave mirror-like reflecting surfaces arranged side by side to constitute a viewing screen, a projecting lens to project a stereoscopic parallax panoramagram upon said elements, each element utilizing the light from said projecting lens to form a real image of said lens, and means to cause planar diffusion of the elemental light beams forming said real images.

HERBERT E. IVES.

DISCLAIMER 1,937,118.—*Herbert E. Ives*, Montclair, N. J. PROJECTING PICTURES IN STEREO-
SCOPIC RELIEF. Patent dated November 28, 1933. Disclaimer filed
September 26, 1935, by the assignee, *Bell Telephone Laboratories, Incorporated*.

Hereby enters this disclaimer to the said claims of said Letters Patent which are in the following words to wit:

"1. In a system for producing pictures in stereoscopic relief, means to project an image of a stereoscopic parallax panoramagram, and means utilizing the light rays which form separated portions of a panoramic strip of said image to form a real image of said projecting means.

"2. In a system for producing pictures in stereoscopic relief, a plurality of elemental image forming means arranged side by side to constitute a viewing screen and means to project a stereoscopic parallax panoramagram upon one side of said screen, each elemental image forming means functioning to form a real image of said projecting means.

"3. In a system for producing pictures in stereoscopic relief, a plurality of elemental image forming means arranged side by side to constitute a viewing screen, means to project a stereoscopic parallax panoramagram upon one side of said screen, each elemental image forming means functioning to form a real image of said projecting means, and means to cause planar diffusion of the elemental light beams forming said real images.

"4. In a system for producing pictures in stereoscopic relief, a plurality of elemental lenticular elements arranged side by side to constitute a viewing screen, and a projecting lens to project a stereoscopic parallax panoramagram upon said elements, each element utilizing the light from said projecting lens to form a real image of said lens.

"5. In a system for producing pictures in stereoscopic relief, a plurality of elemental lenticular elements arranged side by side to constitute a viewing screen, a projecting lens to project a stereoscopic parallax panoramagram upon said elements, each element utilizing the light from said projection lens to form a real image of said lens, and means to cause planar diffusion of the elemental light beams forming said real images."

"9. In a system for producing pictures in stereoscopic relief, means for projecting a stereoscopic parallax panoramagram, means for individually viewing separate portions of each panoramic strip from a given horizontal direction, and means for causing vertical planar diffusion of the projected elemental beams of light representing elemental strip images of said panoramagram.

"10. In a system for producing pictures in stereoscopic relief, a motion-picture film having a plurality of stereoscopic parallax panoramagram pictures printed thereon, means for projecting strip images of said panoramagram pictures, a viewing screen upon which said images are projected, comprising means to control the direction of horizontal transmission of the light rays forming different portions of the panoramic strips, and means for causing vertical planar diffusion of the projected elemental light beams representing strip images of said panoramagram pictures.

"11. In a system for producing pictures for viewing in stereoscopic relief, means for projecting stereoscopic strip images of an object upon a viewing screen, said screen having horizontally positioned means for causing vertical diffusion exclusively of the elemental light beams representing strip images of said object, and vertically positioned means for causing horizontal diffusion exclusively of said elemental beam, whereby pictures may be viewed in stereoscopic relief.

"12. The method of projecting images visible in stereoscopic relief which comprises projecting an image of a stereoscopic parallax panoramagram, deviating the light rays which form elemental portions of each panoramic strip so that they all pass to and through a point in space close to said image, and viewing said rays after they pass through said point."

"14. In a system for producing pictures in stereoscopic relief, a plurality of elemental concave mirror-like reflecting surfaces arranged side by side to constitute a viewing screen, and a projecting lens to project a stereoscopic parallax panoramagram upon said elements, each element utilizing the light from said projecting lens to form a real image of said lens.

"15. In a system for producing pictures in stereoscopic relief, a plurality of elemental concave mirror-like reflecting surfaces arranged side by side to constitute a viewing screen, a projecting lens to project a stereoscopic parallax panoramagram upon said elements, each element utilizing the light from said projecting lens to form a real image of said lens, and means to cause planar diffusion of the elemental light beams forming said real images."

[*Official Gazette October 22, 1935.*]